(12) United States Patent
Kim et al.

(10) Patent No.: US 12,348,978 B2
(45) Date of Patent: Jul. 1, 2025

(54) APPARATUS AND METHOD FOR AP PLACEMENT OF LARGE-SCALE WIRELESS LAN AND ADAPTIVE WIRELESS RESOURCE MANAGEMENT

(71) Applicant: Pusan National University Industry-University Cooperation Foundation, Busan (KR)

(72) Inventors: Jongdeok Kim, Busan (KR); Jaemin Lee, Busan (KR); Junhwan Huh, Busan (KR); Changhong Lee, Busan (KR); Donghyun Kim, Busan (KR)

(73) Assignee: PUSAN NATIONAL UNIVERSITY INDUSTRY-UNIVERSITY COOPERATION FOUNDATION, Busan (KR)

( * ) Notice: Subject to any disclaimer, the term of this patent is extended or adjusted under 35 U.S.C. 154(b) by 443 days.

(21) Appl. No.: 17/950,570

(22) Filed: Sep. 22, 2022

(65) Prior Publication Data
US 2023/0156484 A1    May 18, 2023

(30) Foreign Application Priority Data
Nov. 17, 2021  (KR) .......................... 10-2021-0158144

(51) Int. Cl.
*H04W 16/18*    (2009.01)
*H04W 16/22*    (2009.01)
*H04W 84/12*    (2009.01)

(52) U.S. Cl.
CPC .......... *H04W 16/18* (2013.01); *H04W 16/22* (2013.01); *H04W 84/12* (2013.01)

(58) Field of Classification Search
CPC ...... H04W 16/18; H04W 16/22; H04W 84/12
See application file for complete search history.

(56) References Cited

U.S. PATENT DOCUMENTS

| | | | |
|---|---|---|---|
| 2010/0150027 A1* | 6/2010 | Atwal ................... | H04W 16/18 370/254 |
| 2019/0239100 A1* | 8/2019 | Pandey ................. | G06N 20/00 |
| 2023/0053044 A1* | 2/2023 | Wang ................... | H04W 24/04 |

FOREIGN PATENT DOCUMENTS

| | | |
|---|---|---|
| JP | 2004-304255 A | 10/2004 |
| JP | 2005-117357 A | 4/2005 |
| JP | 2019-092125 A | 6/2019 |
| KR | 10-2003-0086366 A | 11/2003 |
| KR | 10-2010-0067517 A | 6/2010 |

(Continued)

OTHER PUBLICATIONS

Korean Office Action for related KR Application No. 10-2021-0158144 mailed Nov. 14, 2022 from Korean Intellectual Property Office.

(Continued)

*Primary Examiner* — Brian P Cox
(74) *Attorney, Agent, or Firm* — Paratus Law Group, PLLC

(57) ABSTRACT

Provided are an apparatus and method for AP placement of large-scale wireless LAN and adaptive wireless resource management enabling to analyze and utilize actual use patterns that were not reflected in initial installation to express characteristics of a building, and to establish strategies for selecting an optimal AP location and wireless resource management based thereon.

13 Claims, 9 Drawing Sheets

(56) References Cited

FOREIGN PATENT DOCUMENTS

KR   10-2013-0116529 A   10/2013

OTHER PUBLICATIONS

Korean Office Action for related KR Application No. 10-2021-0158144 mailed Jun. 26, 2023 from Korean Intellectual Property Office.
Greg Durgin, "WAV05: Path Loss Exponent Model", Sep. 23, 2020, https://www.youtube.com/watch?v=mGVgqYZShCA.

* cited by examiner

FIG.8

Algorithm 2: Check constraints

Input : $A, S, \Omega, P, C, n, etc.$
Output : an indicator $I$ (if $A$ is feasible, then $I = TRUE$; otherwise $I = FALSE$)

$I \leftarrow TRUE$
if $C1$ can be met then
    for each ap in A do
        Call Algorithm 1 to obtain the throughput of STAs
        if $C2$ and $C3$ cannot be met then
            $I \leftarrow FALSE$ Quit the loop
        else
        end
    end
else
    $I \leftarrow FALSE$
end
Return $I$

---

Algorithm 1: Calculate the throughput of STAs

Input : $A, S, P, C, etc.$
Output : $\delta_i (i \in S)$.
Step 1. STAs-APs association.
Step 2. RU assignment for the STAs.
Step 3. Obtaining the data rate of STAs.
Step 4. Calculating the throughput of STAs

APPARATUS AND METHOD FOR AP PLACEMENT OF LARGE-SCALE WIRELESS LAN AND ADAPTIVE WIRELESS RESOURCE MANAGEMENT

CROSS-REFERENCE TO RELATED APPLICATION

This application claims to Korean Patent Application No. 10-2021-0158144 (filed on Nov. 17, 2021), which is hereby incorporated by reference in its entirety.

BACKGROUND

One or more example embodiments relate to wireless resource management, and particularly to an apparatus and method for AP placement of large-scale wireless LAN and adaptive wireless resource management enabling to analyze and utilize actual use patterns that were not reflected in initial installation to express characteristics of a building, and establish strategies for selecting an optimal AP location and wireless resource management based thereon.

Due to the increase in mobile devices such as smart phones, laptops, and tablet PCs, the use of Internet services through wireless LAN based on IEEE 80211 WLAN standard is rapidly increasing.

Accordingly, buildings, offices, campuses, and public institutions provide wireless LAN services by installing access points (APs) for user convenience. However, due to the nature of a wireless signal, a service area of one AP is quite narrow compared to a cellular network and the service area becomes narrower due to signal attenuation and the like, in particular, indoors.

In addition, when each AP is installed indiscriminately and operates independently, expected performance is considerably lowered due to mutual interference. In addition, in an independently installed AP environment, seamless hand-off of mobile stations, which is one of the major issues in wireless LAN, is impossible.

In particular, as the number of devices supporting wireless LAN (WLAN) such as a smartphone increases, and consumption of high-capacity content increases, accordingly users' request for quality improvement of wireless LAN is increasing.

In general, in order to improve WLAN performance, solutions such as increasing system bandwidth and improving peak transmission rates have been proposed. In addition, in an environment in which a plurality of APs are dense and the coverage of APs overlap, there are proposed methods to support simultaneous access by many terminals while enhancing the sensible performance of users who require high capacity and high rate services.

The AP is affected by attenuated, reflected, refractioned, diffracted, dispersed (scattered) and blocked during radio wave transmission according to the location of the site where it is fixedly installed, that is, due to the influence of the surrounding environment and the structure of buildings, etc.

Therefore, it is very important to set the AP at an appropriate location in consideration of various surrounding environments in the wireless LAN.

As described above, the optimal design of the location of the AP of wireless LAN is an important issue directly related to the quality of service and cost reduction. In order to find the optimal AP location, not only a radio wave intensity of the service area according to the location of the AP, but also regional characteristics of the environment and user demand traffic should be considered.

The limitations occur in an initial installation stage of large-scale wireless LAN environment make it difficult to reflect the characteristics of service users in a space, and simply place APs with the goal of minimizing service shadow areas.

FIG. 1 is a configuration diagram of AP placement in the initial installation stage of large-scale wireless LAN environment according to a related art.

FIG. 1 illustrates placing the AP assuming that there are simply plenty of STAs without knowing the status of the actual space, which does not collect information (the number of people, channel status) about the space in which the APs are to be placed and, since there is no information about the space, an optimal placement method is derived assuming a situation where plenty of people use the space.

Therefore, although this related art is suitable as a method for placing APs for the first time, there is a limit in expressing the characteristics of a building and establishing strategies for selecting the optimal AP location and wireless resource management based thereon.

Therefore, there is a need to develop a new technology that enables to analyze and utilize actual use patterns that were not reflected in the initial installation to provide an efficient wireless LAN service.

PRIOR ART DOCUMENT

Patent Document (Patent Document 1) Korean Patent Application Publication No. 10-2003-0086366
(Patent Document 2) Korean Patent Application Publication No. 10-2010-0067517
(Patent Document 3) Korean Patent Application Publication No. 10-2013-0116529

SUMMARY

Example embodiments have been made in an effort to solve the issues of the wireless resource management technology according to the related art, and provide an apparatus and method for AP placement of large-scale wireless LAN and adaptive wireless resource management enabling to analyze and utilize actual use patterns that were not reflected in the initial installation to express the characteristics of a building, and to establish strategies for selecting an optimal AP location and wireless resource management based thereon.

Example embodiments provide an apparatus and method for AP placement of large-scale wireless LAN and adaptive wireless resource management enabling simulation of WiFi wireless status for simulation, establishment of a strategy for an optimal AP placement based on 802.11ax, and adaptive wireless resource management by collecting the status of the AP in a large-scale wireless LAN environment.

Example embodiments provide an apparatus and method for AP placement of large-scale wireless LAN and adaptive wireless resource management enabling to efficiently optimize AP replacement, channel allocation, and transmission/reception power control in areas with poor quality by providing an automated wireless LAN management service framework by reflecting the service use pattern of WiFi users to the simulation.

Example embodiments provide an apparatus and method for AP placement of large-scale wireless LAN and adaptive wireless resource management enabling to collect AP status information to reflect the wireless status in the space to be managed, and to efficiently improve the performance of wireless LAN in an environment in which an existing AP is placed through resource management in consideration of the characteristics of the space that change over time (the number of devices, channel occupancy, etc.).

Objects of the present disclosure are not limited to the above-mentioned objects, and other objects not mentioned will be clearly understood by those skilled in the art from the following description.

According to an aspect, there is provided an apparatus for AP placement of large-scale wireless LAN and adaptive wireless resource management including a layer environment simulator configured to simulate a layer environment expressing status of an AP through collected data, a constraint condition checker configured to select an existing location for initial AP placement and check a constraint condition at the existing location, an AP placement determinator configured to add an AP if the condition checked by the constraint condition checker is not satisfied, an STA change size decider configured to decide a size of STA change over time, and a wireless resource change manager configured to change wireless resources when the STA change over time is greater than a reference α, otherwise maintain the original status.

Here, the AP placement determinator may be configured to divide a management space into grids if the condition is not satisfied, and add the AP to the grid with the highest density of STAs in the grid.

The AP placement determinator may be configured to determine a location to add the AP until the constraint condition is satisfied, and determine a location of the AP that satisfies a situation with the largest number of devices in a management space.

The layer environment simulator may include a data preparation part configured to collect both 2.4 GHz band and 5 GHz band in the AP with data of a used channel item which means a channel used for a unit time, a channel use rate item which refers to a ratio occupied by the channel for the unit time, and a maximum number of connected devices item which refers to the number of most connected devices connected during the unit time as a configuration unit.

The layer environment simulator may include a data expression part configured to add up the number of connected devices of one AP by averaging values of the two bands (2.4, 5 GHz), and maintain a matrix for ratios and use rates of channels used by APs.

The layer environment simulator may include an AP status simulation part configured to generate Unmanaged APs as many as types of channels used by the APs, wherein each of the Unmanaged APs is allocated the used channel without overlapping, each of the APs generates traffic corresponding to a use rate for the allocated channels, and configured to randomly place STAs of the number of connected devices within an AP coverage range to simulate the number of connected devices.

According to another aspect, there is provided a method of AP placement of large-scale wireless LAN and adaptive wireless resource management including an layer environment simulation operation of simulating a layer environment expressing status of an AP through collected data, a constraint condition check operation of selecting an existing location for initial AP placement and checking a constraint condition at the existing location, an AP placement determination operation of adding an AP if the condition checked in the constraint condition check operation is not satisfied, an STA change size decision operation of deciding a size of STA change over time, and a wireless resource change management operation of changing wireless resources when the STA change over time is greater than the reference α, otherwise maintaining the original status.

According to example embodiments, an apparatus and method for AP placement of large-scale wireless LAN and adaptive wireless resource management have the following effects.

First, it is possible to analyze and utilize actual use patterns that were not reflected in the initial installation to express the characteristics of a building, and to establish strategies for selecting an optimal AP location and wireless resource management based thereon.

Second, it is possible to enable simulation of WiFi wireless status for simulation, a strategy for an optimal AP placement based on 802.11ax, and adaptive wireless resource management by collecting the status of the AP in a large-scale wireless LAN environment.

Third, it is possible to efficiently optimize AP replacement, channel allocation, and transmission/reception power control in areas with poor quality by providing an automated wireless LAN management service framework by reflecting the service use pattern of WiFi users to the simulation.

Fourth, it is possible to collect AP status information to reflect the wireless status in the space to be managed, and to efficiently improve the performance of wireless LAN in an environment in which an existing AP is placed through resource management in consideration of the characteristics of the space that change over time (the number of devices, channel occupancy, etc.).

BRIEF DESCRIPTION OF THE DRAWINGS

These and/or other aspects, features, and advantages of the invention will become apparent and more readily appreciated from the following description of example embodiments, taken in conjunction with the accompanying drawings of which:

FIG. 8 is an algorithm for a constraint condition and AP additional placement;

DETAILED DESCRIPTION

Hereinafter, preferred embodiments of an apparatus and method for AP placement of large-scale wireless LAN and adaptive wireless resource management according to example embodiments will be described in detail as follows.

The features and advantages of the apparatus and method for AP placement of large-scale wireless LAN and adaptive wireless resource management according to example embodiments will become more apparent from the following description of example embodiments.

Figure 1:
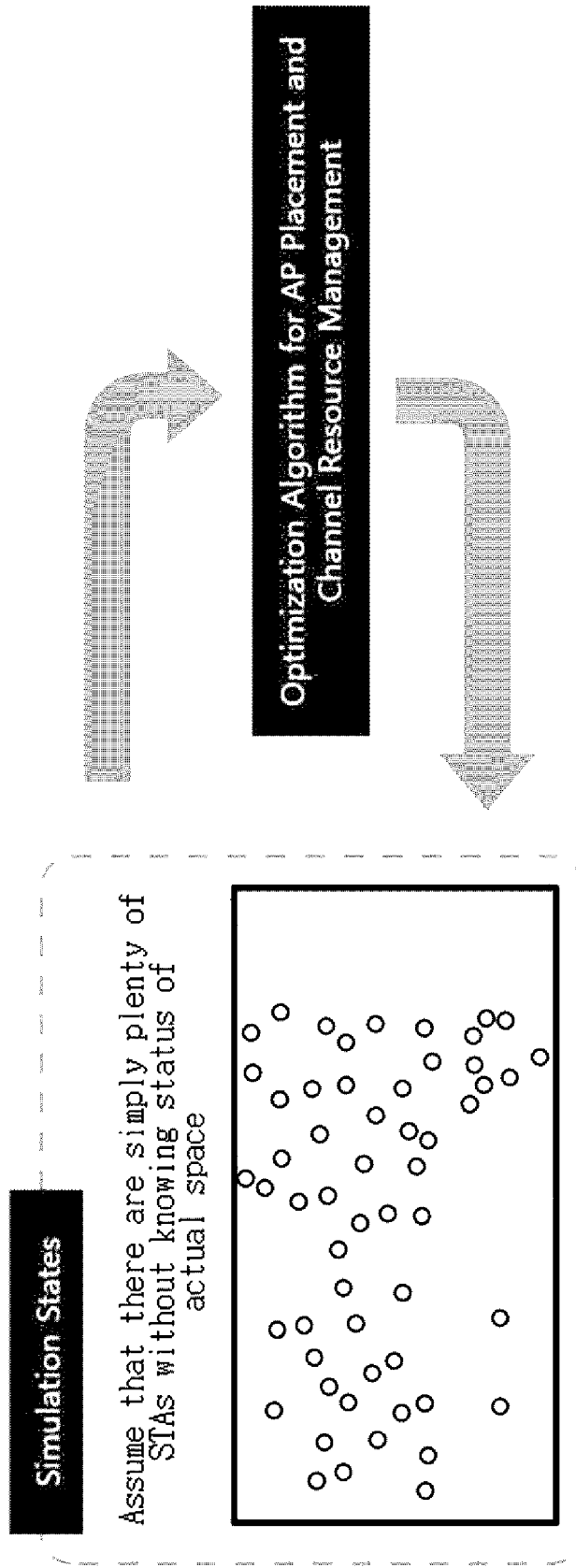
FIG. 1 is a configuration diagram illustrating an AP placement in an initial installation stage of a large-scale wireless LAN environment according to a related art.
Figure 2:
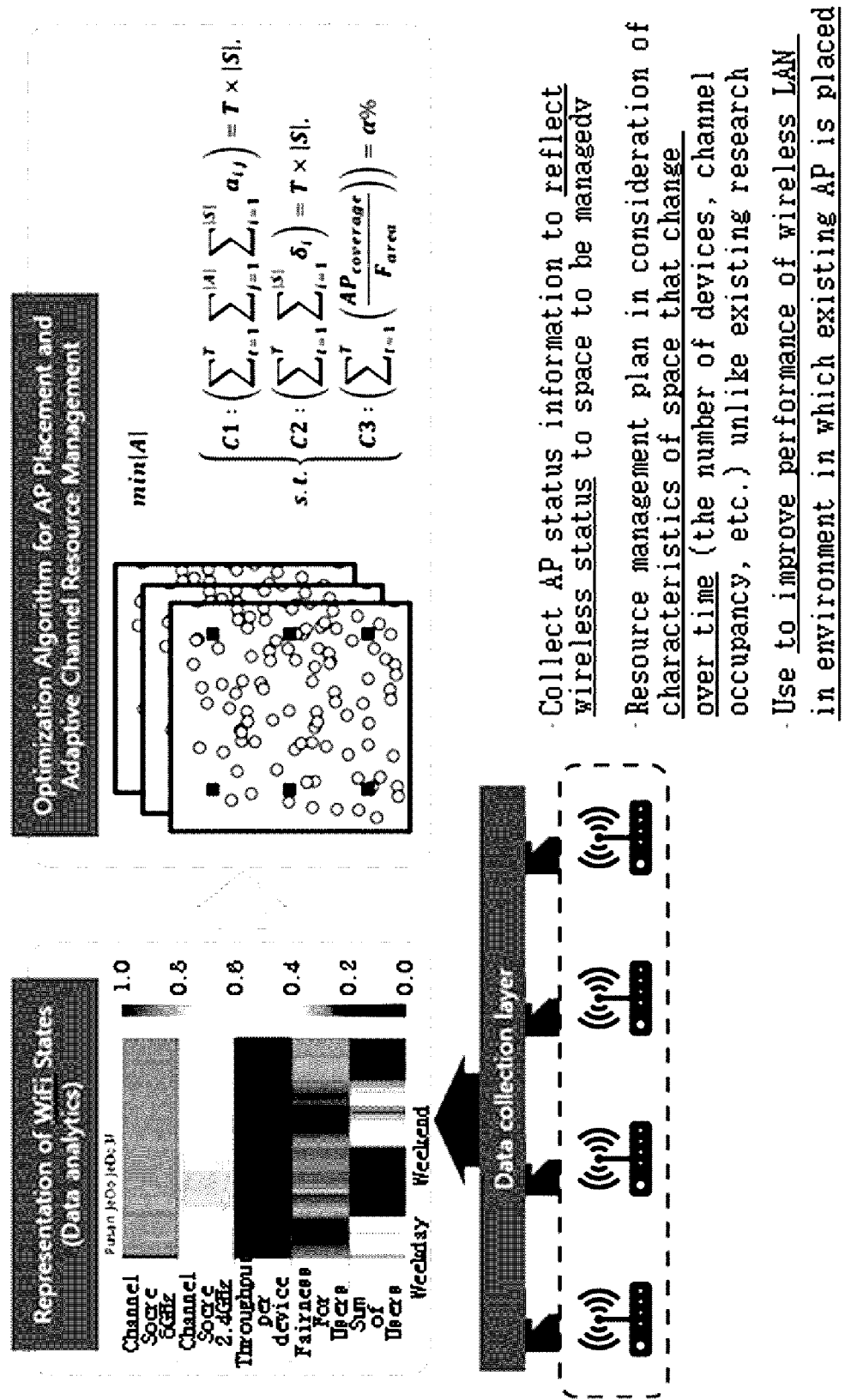
FIG. 2 is a configuration diagram illustrating features for AP placement of large-scale wireless LAN and adaptive wireless resource management according to an example embodiment.

FIG. 2 is a configuration diagram illustrating features for AP placement of large-scale wireless LAN and adaptive wireless resource management according to an example embodiment.

The apparatus and method for AP placement of large-scale wireless LAN and adaptive wireless resource management according to example embodiments enable to analyze and utilize actual use patterns that were not reflected in the initial installation to express the characteristics of a building, and establish strategies for selecting an optimal AP location and wireless resource management based thereon.

For this, the example embodiments may include a configuration enables to simulate WiFi wireless status for simulation, strategy for an optimal AP placement based on 802.11ax, and adaptive wireless resource management by collecting the status of the AP in a large-scale wireless LAN environment.

The example embodiments may include a configuration enables to efficiently optimize AP replacement, channel allocation, and transmission/reception power control in areas with poor quality by providing an automated wireless LAN management service framework by reflecting the service use pattern of WiFi users to the simulation.

The example embodiments may include a configuration enables to collect AP status information to reflect the wireless status in the space to be managed, and to efficiently improve the performance of wireless LAN in an environment in which an existing AP is placed through resource management in consideration of the characteristics of the space that change over time (the number of devices, channel occupancy, etc.).

As shown in FIG. 2, it is possible to analyze and utilize actual use patterns that were not reflected in the initial installation using the periodically measured large-scale wireless LAN environment data, express the characteristics of a building through the collected data, and establish strategies for selecting an optimal AP location and wireless resource management based thereon.

Figure 3:
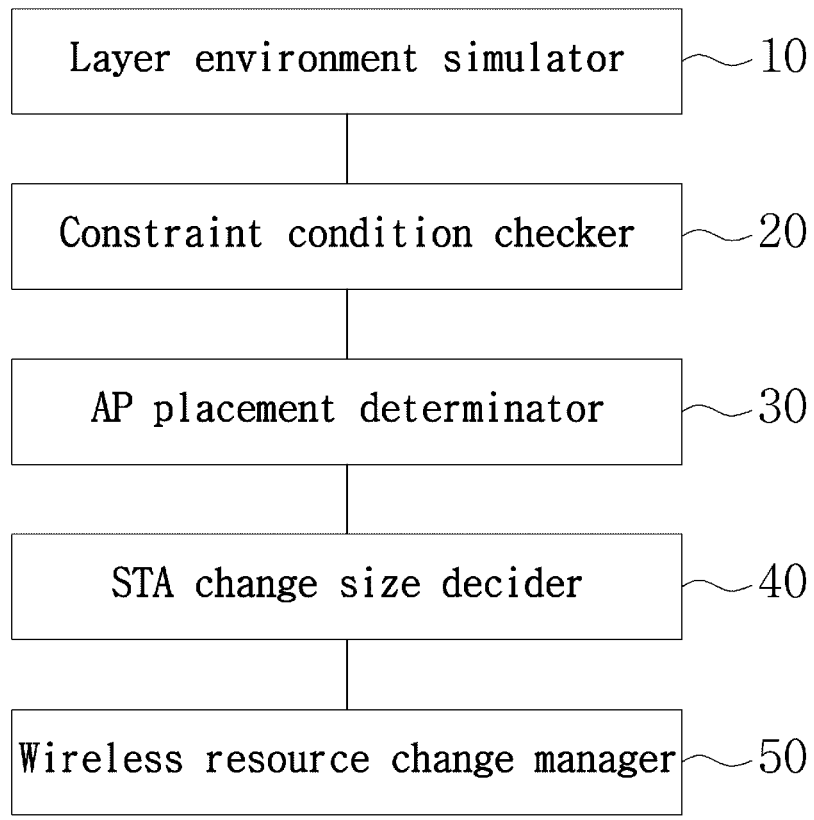
FIG. 3 is a configuration block diagram illustrating an apparatus for AP placement of large-scale wireless LAN and adaptive wireless resource management according to an example embodiment.

FIG. 3 is a configuration block diagram of an apparatus for AP placement of large-scale wireless LAN and adaptive wireless resource management according to an example embodiment.

According to an example embodiment, as shown in FIG. 3, the apparatus for AP placement of large-scale wireless LAN and adaptive wireless resource management includes a layer environment simulator 10 configured to simulate a layer environment expressing the status of an AP through collected data, a constraint condition checker 20 configured to select an existing location for initial AP placement and check a constraint condition at the existing location, an AP placement determinator 30 configured to add the AP if the condition checked by the constraint condition checker is not satisfied, an STA change size decider 40 configured to decide a size of STA change over time, and a wireless resource change manager 50 configured to change wireless resources when the STA change over time is greater than a reference α, otherwise maintain the original status.

Here, the AP placement determinator 30 is configured to divide a management space into grids if the condition is not satisfied, and add the AP to the grid with the highest density of STAs in the grid.

The AP placement determinator 30 is configured to determine a location to add the AP until the constraint condition is satisfied, and determine the location of the AP that satisfies the situation with the largest number of devices in the management space.

A detailed configuration of the layer environment simulator 10 is as follows.

Figure 4:
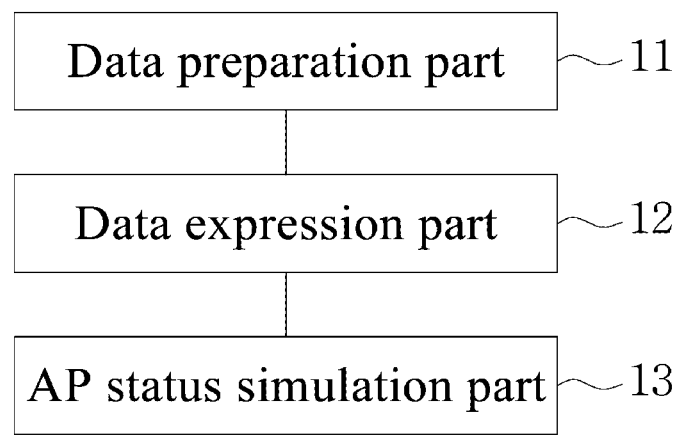
FIG. 4 is a detailed configuration diagram illustrating a layer environment simulator.

FIG. 4 is a detailed configuration diagram of the layer environment simulator.

The layer environment simulator 10 includes a data preparation part 11 configured to collect data of a used channel item which means a channel used for a unit time, a channel use rate item which is a ratio occupied by the channel for the unit time, and a maximum number of connected devices item which is the number of most connected devices connected during the unit time for both 2.4 GHz band and 5 GHz band in the AP on an hourly basis, a data expression part 12 configured to add up the number of connected devices of one AP by averaging values of the two bands (2.4, 5 GHz), and maintain a matrix for ratios and use rates of channels used by APs, and an AP status simulation part 13 configured to generate Unmanaged APs as many as types of channels used by the APs, wherein each of the Unmanaged APs is allocated the used channel without overlapping, each of the APs generates traffic corresponding to a use rate for the allocated channels, and configured to randomly place STAs of the number of connected devices within an AP coverage range to simulate the number of connected devices.

A method of AP placement of large-scale wireless LAN and adaptive wireless resource management according to an example embodiment will be described in detail as follows.

Figure 5:
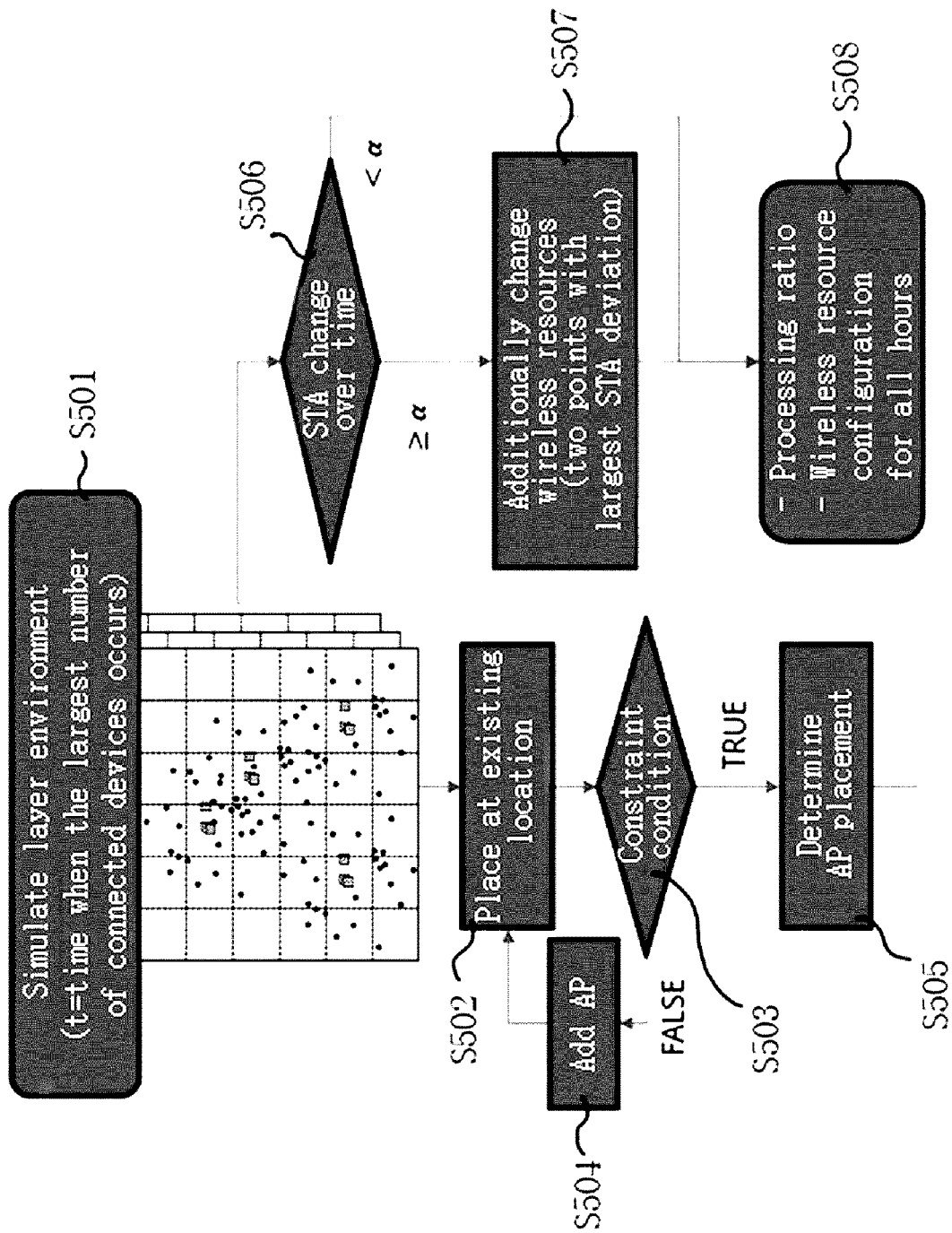
FIG. 5 is a flowchart illustrating a method of AP placement of large-scale wireless LAN and adaptive wireless resource management according to an example embodiment.

FIG. 5 is a flowchart illustrating a method of AP placement of large-scale wireless LAN and adaptive wireless resource management according to an example embodiment.

First, layer environment simulation expressing the status of the AP through collected data is performed (S501).

The simulated layer environment is selected by the time with the largest number of connected devices.

Next, an existing location is selected for the initial AP placement (S502).

When checking the constraint condition at the existing location (S503), an AP is added if the condition is not satisfied (S504).

The management space is divided into grids, and the AP to be add is added to the grid with the highest density of STAs in the grid.

The location is determined by adding the AP until the constraint condition is satisfied. Through this process, the location of the AP that satisfies the situation with the largest number of devices in the management space is determined.

Next, the size of STA change over time is decided (S506).

If the STA change over time is greater than the reference α, the radio resource is changed, otherwise the original status is maintained (S507).

The simulation result by operation S508 is wireless resource configuration and a processing ratio of STAs.

In the present disclosure, the space required to be managed is simulated and the minimum APs required for the space is selected.

If the number of APs is too small, the quality of the wireless LAN is deteriorated. Conversely, if the number of APs is too large, interference between APs also increases, which actually disturbs quality improvement.

To optimize this, it is need to find the minimum number of APs. In order to prevent deterioration of WLAN quality that occurs when the number of APs decreases, the following three constraint conditions exist.

The constraint conditions may be defined as in Equation 1.

$$\min |A| \qquad \text{[Equation 1]}$$

$$\text{s.t.} \begin{cases} C1: \left( \sum_{t=1}^{T} \sum_{j=1}^{|A|} \sum_{i=1}^{|S|} a_{i,j} \right) = T \times |S|, \\ C2: \left( \sum_{t=1}^{T} \sum_{i=1}^{|S|} \delta_i \right) = T \times |S|, \\ C3: \left( \sum_{t=1}^{T} \left( \frac{AP_{coverage}}{F_{area}} \right) \right) = \beta\% \end{cases}$$

$$a_{i,j} = \begin{cases} 1 & \text{if } STA\ i \text{ associates with } AP\ j \\ 0 & \text{otherwise} \end{cases}$$

$$\delta_i = \begin{cases} 1 & \text{if } \delta_i \geq \rho \\ 0 & \text{otherwise} \end{cases}$$

C1: All STAs should be connected to APs.
C2: All STAs guarantee a processing ratio ρ.
C3: Coverage of APs is β % or more.

The operation of data preparation for the layer environment simulation will be described in detail as follows.

Table 1 shows an example of data for the layer environment simulation.

TABLE 1

| Symbol | Meaning |
|---|---|
| AP | AP set |
| T | Sampling timing (24 hours) <br> $0 \leq t < 24, t \in T$ |
| CH | Channel set of 2.4 GHz and 5 GHz |
| $A_{i,t}$ | Array of maximum number of connected devices in 2.4 GHz band between time t-1 and t of AP i, i ∈ A, t ∈ T |
| $B_{i,t}$ | Array of maximum number of connected devices in 5 GHz band between time t-1 and t of AP i, i ∈ A, t ∈ T |
| $C_{i,t}$ | Array of used channels in 2.4 GHz band between time t-1 and t of AP i, i ∈ A, t ∈ T |
| $D_{i,t}$ | Array of used channels in 5 GHz band between time t-1 and t of AP i, i ∈ A, t ∈ T |
| $E_{i,t}$ | Array of average channel use rates in 2.4 GHz band between time t-1 and t of AP i, i ∈ A, t ∈ T |
| $F_{i,t}$ | Array of average channel use rates in 5 GHz band between time t-1 and t of AP i, i ∈ A, t ∈ T |

Data is collected in both the 2.4 and 5 GHz bands from the AP on an hourly basis. The properties to be collected are as follows.

The used channel means the channel used for a unit time, the channel use rate means the ratio occupied by the channel for the unit time, and the maximum number of connected devices means the number of the most connected devices during the unit time.

The reason the collected data is an array is that data collection may occur multiple times at the time of sampling. Sampling index has 24 indexes from 0 o'clock to 23 o'clock.

For example, when collecting data for 30 days, the length of the data array is 30.

The operation of data expression for the layer environment simulation is described in detail as follows.

Table 2 defines symbols and equations in the operation of data expression for the layer environment simulation.

TABLE 2

| Symbol | Numerical expression |
|---|---|
| $ND_{i,t}$ | $ND_{i,t} = \frac{1}{|A_{i,t}|} \sum_{j=1}^{|A_{i,t}|} A_{i,t}[j] + \frac{1}{|B_{i,t}|} \sum_{j=1}^{|B_{i,t}|} B_{i,t}[j], i \in A, t \in T$ |
| $CR_i$ | Used channel ratio matrix <br> (row: time index T, column: channel set CH) |
| $CU_i$ | channel use rate matrix <br> (row: time index T, column: channel set CH) |

Figure 6A:
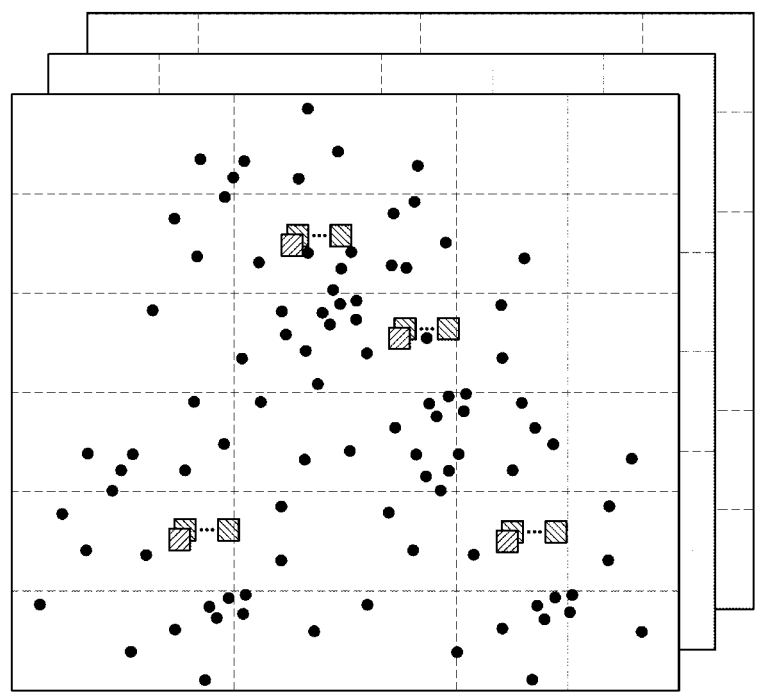
FIGS. 6A and 6B are diagrams illustrating data expression of a layer environment simulation process.
Figure 6B:
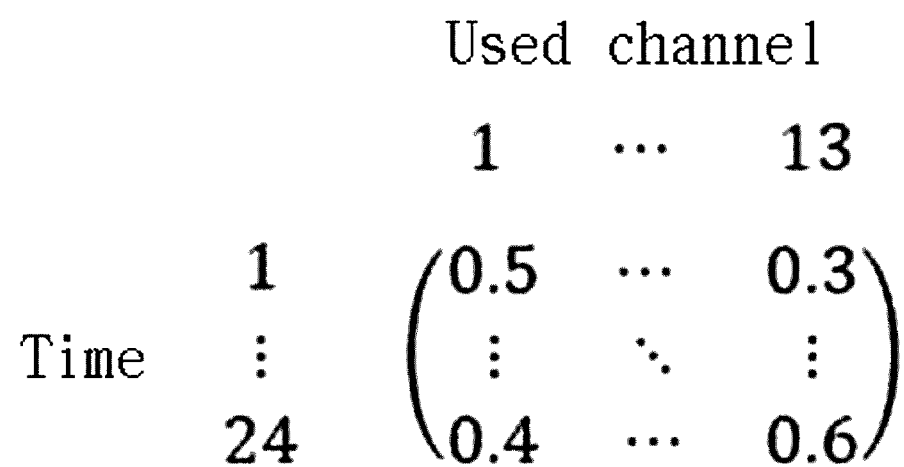

FIGS. 6A and 6B are diagrams illustrating data expression of the layer environment simulation process.

The number of connected devices of one AP is summed by averaging the values of the two bands (2.4, 5 GHz). The reason for summing the number of devices connected to the two bands is because it is assumed that STAs and APs are devices of 802.11n or higher and that both bands can be used.

It is also assumed that a WLAN service controller can modify the bands of the connected STAs.

The matrix is maintained for the ratio and use rate of channels used by APs.

In addition to the use of wireless resources by the corresponding AP, the channel use rate also includes information about the use of wireless resources by APs not subject to management.

The AP status simulation for the layer environment simulation will be described in detail as follows.

Figure 7:
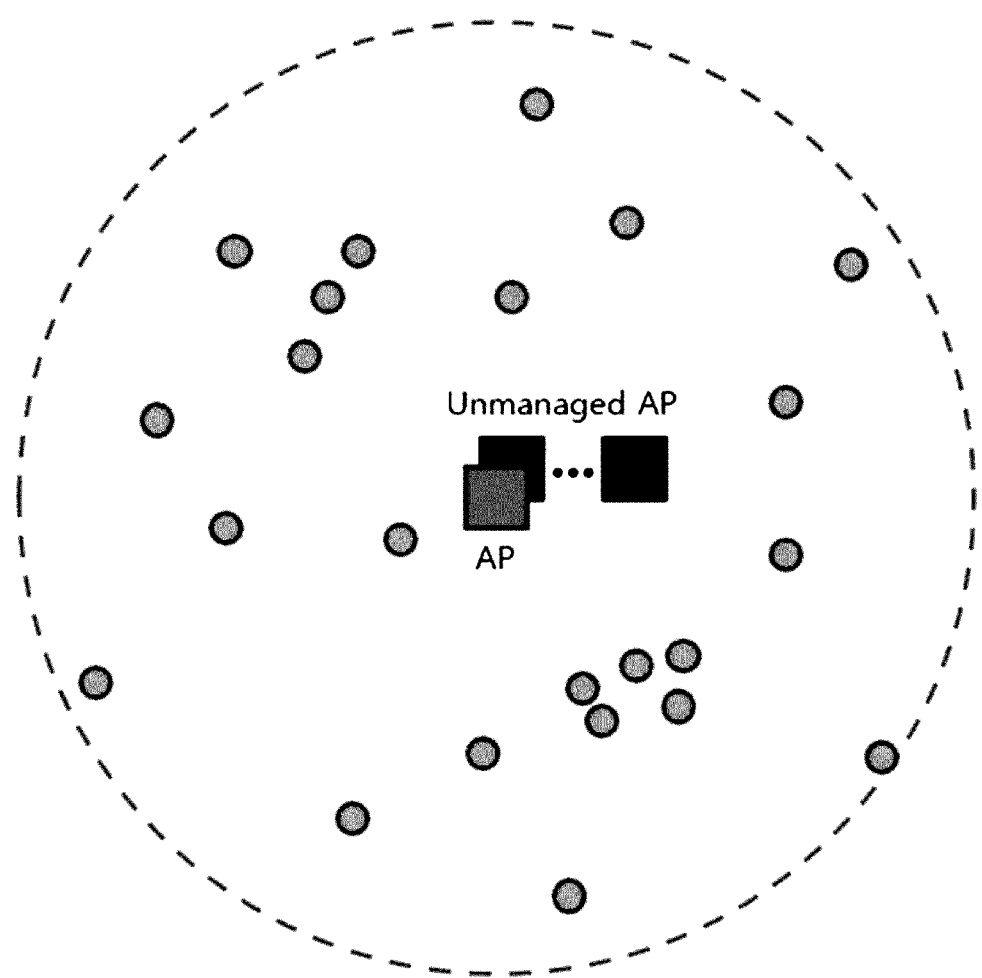
FIG. 7 is a configuration diagram illustrating an example of an AP status simulation process.

FIG. 7 is a configuration diagram illustrating an example of the AP status simulation process.

Channel status simulation creates an Unmanaged APs as many as the types of channels used by the AP.

Each of the Unmanaged APs is allocated the used channel without overlapping.

Each of the APs generates traffic corresponding to the use rate $CU_i[t,c]$ for the assigned channels.

Simulation of the number of connected devices is executed by randomly placing the STA of the number of connected devices $ND_{i,t}$ within the AP coverage range.

FIG. 8 is an algorithm for the constraint condition and AP additional placement.

The constraint condition is algorithm that are executed after placing APs. If the constraint condition is not satisfied, additional placement of APs must be executed.

Figure 9:
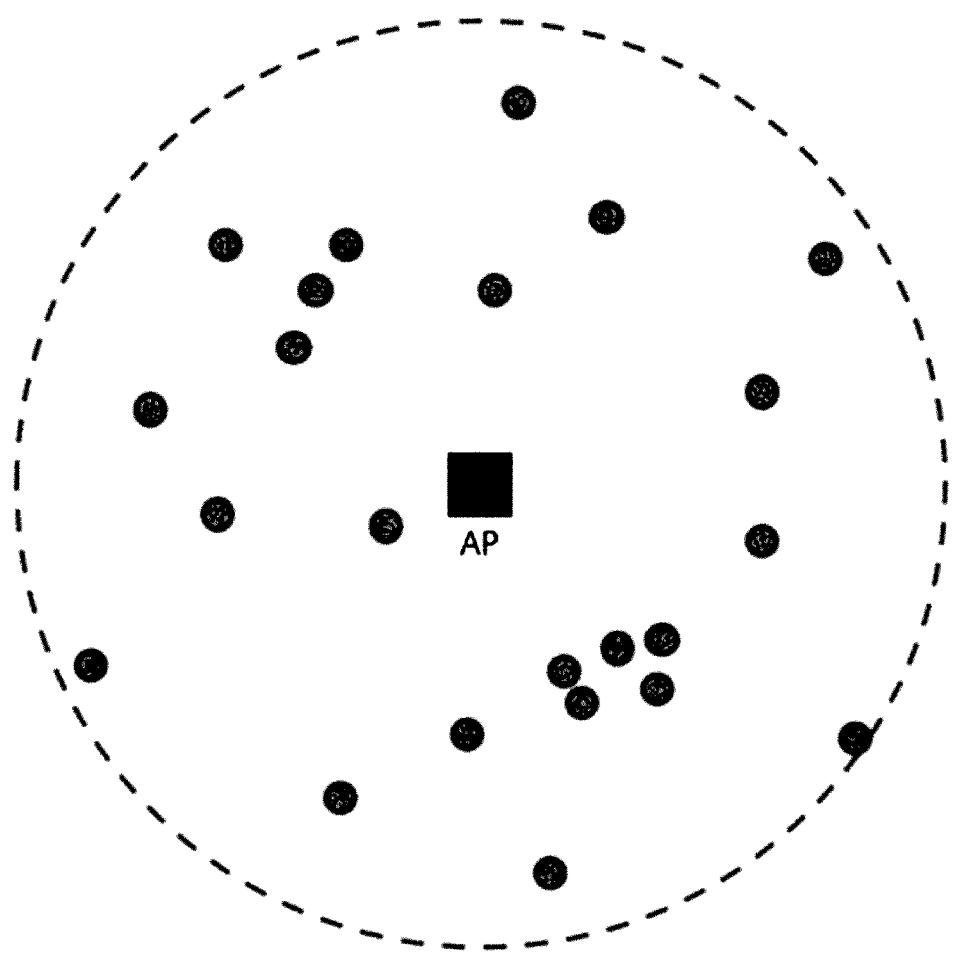
FIG. 9 is a configuration diagram illustrating coverage calculation.

FIG. 9 is a configuration diagram illustrating coverage calculation.

The coverage of one AP is defined as the maximum receivable distance based on a path loss model.

A received signal strength is defined using transmission power of AP i $P_i$, transmission/reception antenna gains $G_{TX}$, $G_{RX}$, and a path loss $P_{lost}$ as in Equation 2.

$$RSS = P_i + G_{TX} - P_{lost} + G_{RX} \qquad \text{[Equation 2]}$$

For the path loss model, refer to Scott Model.

The path loss $P_{ref}$ for the reference distance is usually set to 1 m.

$$P_{lost} = P_{ref} + 10 \log(d^\eta) + \chi \qquad \text{[Equation 3]}$$

Here, η is a path loss index, and χ is the standard deviation for shadow fading.

The RSS calculates the minimum distance by substituting the minimum sensitivity.

$$d = \sqrt[n]{10^{\frac{(P_j + G_{TX} - P_{ref} - X + G_{RX} - RSS)}{10}}}$$ [Equation 4]

Figure 10:
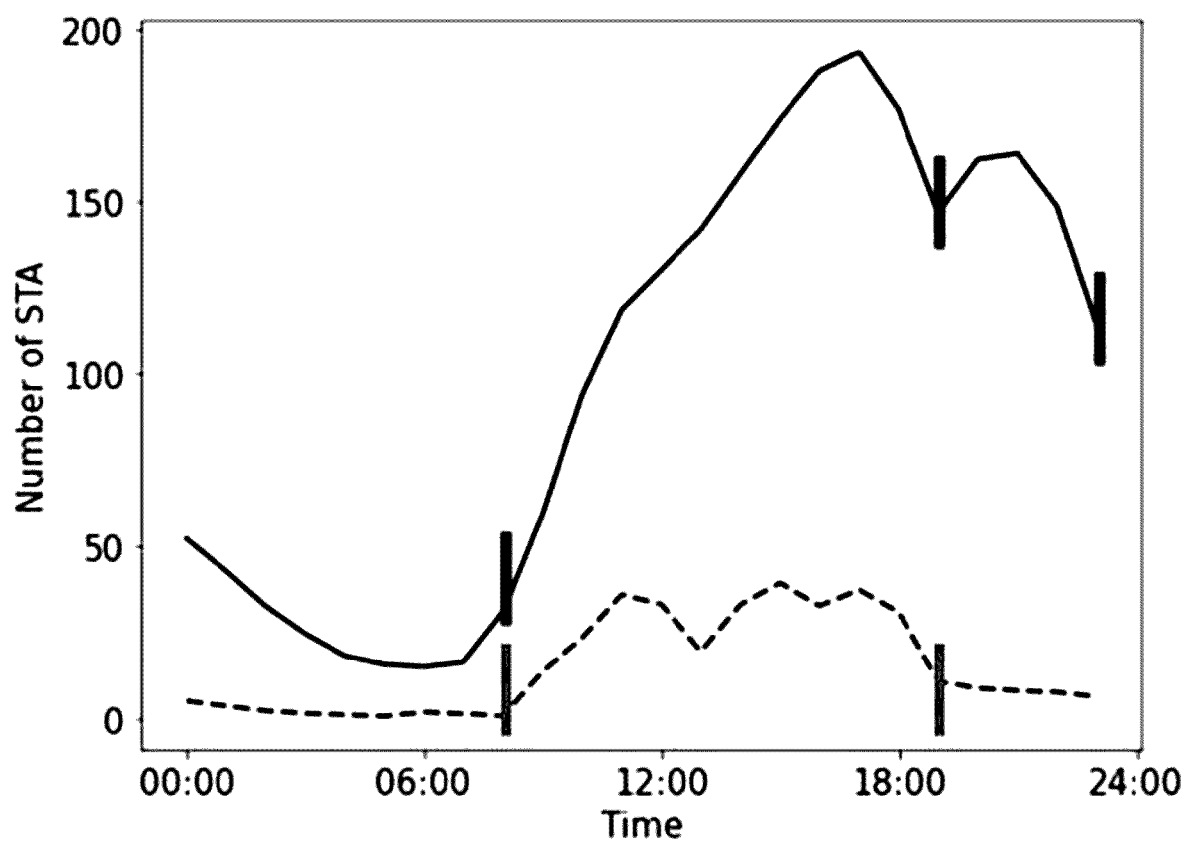
FIG. 10 is a graph illustrating an example of a wireless resource additional change section in consideration of a change in the number of users over time.

FIG. 10 is a graph illustrating an example of a wireless resource additional change section in consideration of a change in the number of users over time.

The simulated environment changes the number of users over time.

Using the same channel in a situation where the number of users changes may not provide a high-quality network.

For example, when the number of users is very large, the quality of the network may be improved by using each channel without overlapping for allocation of channels.

On the contrary, when the number of users is small, the quality of the network may be improved by transmitting a lot of data at the same time through bonding for allocation of channels.

The wireless resource additional change is to observe the change in the number of users between every hour and change the wireless resources at two points with large changes.

The change in the number of users $dND_{i,t}$ is defined as follows.

$$dND_{i,t} = |ND_{i,t+1} - ND_{i,t}|$$ [Equation 5]

The wireless resource change is executed at timing when the change in the number of users is greater than a change in an average number of users and α.

$$dND_{i,t} \geq \alpha E[dND_{i,t}]$$ [Equation 6]

Channel allocation and transmission/reception power adjustment are performed in the same manner as in the existing method.

Further, the processing ratio calculation is as follows.

Channel allocation is placed in the order of distance between channels in order to provide a margin for bonding.

Processing ratio calculation of STAs is executed when APs are placed and channels are distributed to the APs.

First, the AP and the STA are connected, and RUs are allocated to the connected STAs. These STAs calculate the transmission rate and processing ratio.

In the STA-AP Association, in determining the number of AP-connected devices, all stations are connected to an AP with the smallest number of connected devices among APs within a communicable range.

If there are APs with the same number of connected devices, they are connected to an AP with a closer distance.

Channel distribution of connected devices distribute the total number of connected devices in the ratio of (bandwidth)×(1-channel use rate) of 2.4 Ghz and 5 GHz.

In RU Assignment, the maximum number of connected people=the maximum number of 26-tone RUs×spatial stream, and divide s(j) by $m_b$ to find the quotient and the remainder. STAs are divided into (the quotient+1) groups to execute communication.

The apparatus and method for AP placement of large-scale wireless LAN and adaptive wireless resource management according to the example embodiments described above enable to analyze and utilize actual use patterns that were not reflected in the initial installation to express the characteristics of a building, and to establish strategies for selecting an optimal AP location and wireless resource management based thereon.

As described above, the example embodiments enable to simulate WiFi wireless status for simulation, strategy for an optimal AP placement based on 802.11ax, and adaptive wireless resource management by collecting the status of the AP in a large-scale wireless LAN environment.

As described above, it will be apparent to one of ordinary skill in the art that various changes in form and details may be made in these example embodiments without departing from the spirit and scope of the claims and their equivalents.

Therefore, the specific embodiments are to be considered in an illustrative rather than a restrictive sense, the scope of the disclosure is defined not by the detailed description, but by the claims and their equivalents, and all variations within the scope of the claims and their equivalents are to be construed as being included in the disclosure.

| <Description of symbols> | |
|---|---|
| 10. Layer environment simulator | 20. Constraint checker |
| 30. AP placement determinator | 40. STA change size decider |
| 50. Wireless resource change manager | |

What is claimed is:

1. An apparatus for access point (AP) placement of large-scale wireless LAN and adaptive wireless resource management, the apparatus comprising:
    a layer environment simulator configured to simulate a layer environment expressing status of an AP through collected data;
    a constraint condition checker configured to select an existing location for initial AP placement and check a constraint condition at the existing location;
    an AP placement determinator configured to add an AP if the constraint condition checked by the constraint condition checker is not satisfied;
    an STA change size decider configured to decide a size of STA change over time; and
    a wireless resource change manager configured to change wireless resources when the STA change over time is greater than a reference α, otherwise maintain the original status,
    wherein the layer environment simulator comprises a data expression part configured to add up the number of connected devices of one AP by averaging values of 2.4 GHz band and 5 GHz band, and maintain a matrix for ratios and use rates of channels used by APs.

2. The apparatus of claim 1, wherein the AP placement determinator is configured to divide a management space into grids if the constraint condition is not satisfied, and add the AP to a grid with the highest density of STAs in the grids.

3. The apparatus of claim 1, wherein the AP placement determinator is configured to determine a location to add the AP until the constraint condition is satisfied, and determine a location of the AP that satisfies a situation with the largest number of devices in a management space.

4. The apparatus of claim 1, wherein the layer environment simulator comprises a data preparation part configured to collect both 2.4 GHz band and 5 GHZ band in the AP with data of a used channel item which means a channel used for a unit time, a channel use rate item which refers to a ratio occupied by the channel for the unit time, and a maximum number of connected devices item which refers to the number of most connected devices connected during the unit time as a configuration unit.

5. The apparatus of claim 1, wherein the layer environment simulator comprises an AP status simulation part configured to generate, as many as the number of types of channels used by the APs, Unmanaged Aps, wherein each of the Unmanaged APs is allocated a corresponding channel used by the APs without overlapping, each of the APs generates traffic corresponding to a use rate for the allocated channels, and the AP status simulation part is configured to randomly place STAs corresponding to the number of connected devices within an AP coverage range to simulate the number of connected devices.

6. A method of AP placement of large-scale wireless LAN and adaptive wireless resource management, the method comprising:
   an layer environment simulation operation of simulating a layer environment expressing status of an AP through collected data;
   a constraint condition check operation of selecting an existing location for initial AP placement and checking a constraint condition at the existing location;
   an AP placement determination operation of adding an AP if the constraint condition checked in the constraint condition check operation is not satisfied;
   an STA change size decision operation of deciding a size of STA change over time; and
   a wireless resource change management operation of changing wireless resources when the STA change over time is greater than the reference α, otherwise maintaining the original status,
   wherein a coverage of one AP is defined as a maximum receivable distance based on a path loss model, and
   a received signal strength is defined as $RSS = P_i + G_{TX} - P_{lost} + G_{RX}$,
   where $P_i$ is transmission power of AP i, $G_{TX}$, $G_{RX}$ are transmission/reception antenna gains, and $P_{lost}$ is a path loss.

7. The method of claim 6, wherein the AP placement determination operation comprises dividing a management space into grids if the condition is not satisfied, and adding the AP to a grid with the highest density of STAs in the grids.

8. The method of claim 6, wherein the AP placement determination operation comprises determining a location to add the AP until the constraint condition is satisfied, and determining the location of the AP that satisfies a situation with the largest number of devices in a management space.

9. The method of claim 6, wherein the layer environment simulation operation comprises:
   an data preparation operation of collecting both 2.4 GHz band and 5 GHz band in the AP with data of a used channel item which means a channel used for a unit time, a channel use rate item which refers to a ratio occupied by the channel for the unit time, and a maximum number of connected devices item, which refers to the maximum number of devices connected to the AP during the unit time, as a configuration unit;
   a data expression operation of adding up the number of connected devices of one AP by averaging values of the two bands (2.4, 5 GHZ), and maintaining a matrix for ratios and use rates of channels used by APs; and
   an AP status simulation operation of generating Unmanaged APs as many as types of channels used by the APs, wherein each of the Unmanaged APs is allocated the used channel without overlapping, each of the APs generates traffic corresponding to a use rate for the allocated channels, and randomly placing STAs of the number of connected devices within an AP coverage range to simulate the number of connected devices.

10. The method of claim 6, wherein, in the constraint condition check operation, the constraint condition is defined as $$\min |A|$$

$$s.t. \begin{cases} C1: \left(\sum_{t=1}^{T} \sum_{j=1}^{|A|} \sum_{i=1}^{|S|} a_{i,j}\right) = T \times |S|, \\ C2: \left(\sum_{t=1}^{T} \sum_{i=1}^{|S|} \delta_i\right) = T \times |S|, \\ C3: \left(\sum_{t=1}^{T} \left(\frac{AP_{coverage}}{F_{area}}\right)\right) = \beta\% \end{cases}$$

$$a_{i,j} = \begin{cases} 1 & \text{if } STA\ i \text{ associates with } AP\ j \\ 0 & \text{otherwise} \end{cases}$$

$$\delta_i = \begin{cases} 1 & \text{if } \delta_i \geq \rho \\ 0 & \text{otherwise} \end{cases}$$

to prevent deterioration of wireless LAN quality that occurs when the number of APs decreases, and comprises the following conditions of C1: All STAs should be connected to APs, C2: All STAs guarantee a processing ratio ρ, and C3: Coverage of APs is β% or more.

11. The method of claim 6, wherein the path loss is defined as $P_{lost} = P_{ref} + 10 \log(d^\eta) + \chi$,
where $P_{ref}$ is the path loss with respect to a reference distance, η is a path loss index, and χ is a standard deviation for shadow fading.

12. The method of claim 11, wherein the received signal strength (RSS) is used to calculate a minimum distance as $$d = \sqrt[\eta]{10^{\frac{(P_j + G_{TX} - P_{ref} - \chi + G_{RX} - RSS)}{10}}}$$

by substituting minimum sensitivity.

13. The method of claim 6, wherein, in the wireless resource change management operation, a wireless resource additional change observes a change in the number of users between every hour and changes the wireless resources at two points with large changes,
   the change in the number of users $dND_{i,t}$ is defined as $dND_{i,t} = |ND_{i,t+1} - ND_{i,t}|$, and
   the change of the wireless resources is performed at timing when the change in the number of users is greater than a change in an average number of users and than α.

* * * * *